3,144,387
ANTI-INFLAMMATORY COMPOSITIONS

Eldon M. Jones, Ann Arbor, Mich., assignor to Parke, Davis & Company, Detroit, Mich., a corporation of Michigan
No Drawing. Filed June 30, 1961, Ser. No. 120,945
6 Claims. (Cl. 167—65)

This invention relates to novel pharmaceutical compositions of utility in the treatment of inflammatory syndromes such as rheumatoid arthritis and variants thereof. The invention also relates to methods for the treatment of inflammatory syndromes. More particularly, the invention relates to pharmaceutical compositions containing a substantially chemically pure N-(trifluoromethylphenyl)anthranilic acid and/or a pharmaceutically-acceptable salt thereof. In the free acid form the said N-(trifluoromethylphenyl)anthranilic acids have the formula

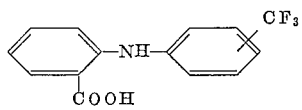

where the (trifluoromethylphenyl) group is attached to the 2, 3 or 4 position of the phenyl ring.

The term "pharmaceutically-acceptable salt" as used herein includes any salt which is not substantially more toxic than an equal weight of the N-(trifluoromethylphenyl)anthranilic acid from which it is derived when measured in the same mammalian host using the same method of administration, vehicle, etc. Some examples of such salts with organic and inorganic bases are the sodium, potassium, calcium, ammonium, choline, 2-hydroxyethylammonium, bis(2 - hydroxyethyl)ammonium, tris(2-hydroxyethyl)ammonium and the like salts. The preferred salts are the pharmaceutically-acceptable salts of an alkali metal, an alkaline earth metal, ammonia or a substituted ammonia. The pharmaceutically-acceptable salts in the compositions of the invention are, like the free acids, substantially chemically pure.

The pharmaceutical compositions of the invention comprise a substantially chemically pure N-(trifluoromethylphenyl)anthranilic acid having the formula given above and/or a pharmaceutically-acceptable salt thereof and a non-toxic pharmaceutical carrier. As used herein the term "non-toxic pharmaceutical carrier" denotes a solid or liquid devoid of significant anti-inflammatory activity composed of a single substance or a number of substances which may be solids, liquids or a combination of solids and liquids each of which is less toxic than an equal weight of the N-(trifluoromethylphenyl)anthranilic acid or salt thereof present in the composition when measured in the same mammalian host using the same method of administration, vehicle, etc. The compositions can be in the form of tablets, lozenges, capsules (either liquid or dry filled), dragees, pills, powders and aqueous and non-aqueous solutions or suspensions. Some examples of the substances which can serve as non-toxic pharmaceutical carriers in the compositions of the invention are gelatin capsules; sugars such as lactose and sucrose; starches, such as corn starch and potato starch; cellulose derivatives, such as sodium carboxymethyl cellulose, ethyl cellulose, methyl cellulose, cellulose acetate phthalate; gelatin; talc; stearic acid; magnesium stearate; vegetable oils, such as peanut oil, cottonseed oil, sesame oil, olive oil, corn oil, and oil of theobroma; propylene glycol; glycerine; sorbitol; polyethylene glycol; water; agar; alginic acid; isotonic saline; and phosphate buffer solutions, as well as other non-toxic compatible substances used in pharmaceutical formulations.

In addition to the substantially chemically pure N-(trifluoromethylphenyl)anthranilic acid and/or pharmaceutically-acceptable salt thereof and a non-toxic pharmaceutical carrier, the compositions of the invention can, and in many cases do, contain coloring agents, flavoring agents, and/or preservatives. These materials are used in relatively small amounts which do not add materially to the toxicity of the final compositions. The compositions can, if desired, also contain other medicinal substances. For example, other anti-inflammatory agents such as the corticosteroids, like prednisone, prednisolone, cortisone, hydrocortisone and the 9 or 12-halocorticosteroids may be incorporated in the compositions. When such agents are used in the oral preparations the amount is adjusted so as to give a daily dosage of 5 to 40 mg. per day of the corticosteroid.

The compositions of the invention can be administered either orally or parenterally, but oral administration is preferred. For the purpose of oral administration solid compositions, such as capsules, tablets, dragees and pills which contain an appropriate amount of the N-(trifluoromethylphenyl)anthranilic acid and/or a pharmaceutically-acceptable salt thereof per dosage unit, are preferred. The solid compositions for oral administration can contain from 25 to 500 mg. of the N-(trifluoromethylphenyl)-anthranilic acid and/or salt thereof per dosage unit. The liquid preparations for oral use are also prepared in such a manner that each dosage unit, such as one teaspoon or a given number of milliliters, contains from 25 to 500 mg. of the N-(trifluoromethylphenyl)anthranilic acid and/or a salt thereof. The daily dosage of the compositions of the invention naturally varies somewhat with the specific anthranilic acid derivative used, with the nature and severity of the inflammatory condition being treated, as well as with the individual patient. However, in general, an oral dosage of between about 100 to 1500 mg. per day is satisfactory.

In preparing the compositions of the invention the conventional pharmaceutical practices and precautions are used. The compositions intended for parenteral administration must be sterile and this can be accomplished either by using sterile ingredients and carrying out the preparation under aseptic conditions or by sterilizing the final composition by one of the usual procedures such as Seitz filtration. Ordinary care should be exercised that no incompatible condition exists between the active component and the carrier or the components thereof, preservative, flavoring agent, coloring agent or any additional medicinal agent in the composition as well as in the conditions employed in the preparation of the compositions.

The methods of the invention comprise the treatment of inflammatory conditions such as rheumatoid arthritis and variants thereof by administering an N-(trifluoromethylphenyl)anthranilic acid or a pharmaceutically-acceptable salt thereof. In the methods of the invention, the aforementioned compounds can be administered either orally or parenterally but oral administration is preferred. The daily dosage naturally varies somewhat with the specific anthranilic acid derivative used, with the nature and severity of the inflammatory condition being treated, as well as with the individual patient. However, in general, an oral dosage of between about 100 to 1500 mg. per day is satisfactory.

In the compositions and methods of the invention, the preferred compounds are N-(3-trifluoromethylphenyl) anthranilic acid of the formula

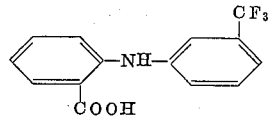

and pharmaceutically-acceptable salts thereof as the 3-isomer exhibits a somewhat higher degree of anti-inflammatory activity than the 2- and 4-isomers.

Inflammatory syndromes, such as rheumatoid arthritis, are a common cause of chronic illness and rank high in causing temporary and permanent disability. Agents presently in use for the treatment of such inflammatory conditions include gold salts, corticosteroids, acetylsalicylic acid and phenylbutazone. Each of these agents has the disadvantage of having relatively low anti-inflammatory activity or of producing an excessive incidence of undesirable side effects. The novel methods and pharmaceutical compositions of the present invention have the advantage of producing a high degree of anti-inflammatory activity with minimal side effects or toxicity.

This is a continuation-in-part of co-pending application Serial No. 756,308, filed August 21, 1958, now abandoned.

The invention is illustrated by the following examples.

*Example 1*

A mixture of 200 g. of N-(3-trifluoromethylphenyl) anthranilic acid, 50 g. of dry potato starch and 50 g. of milk sugar is blended in a mixer. [The N-(3-trifluoromethylphenyl)anthranilic acid exists in crystalline modifications, M.P. about 134–136° C. or M.P. about 125–126° C., resolidifying and remelting at about 134–136° C. Either form can be used.] This dry mixture is wet granulated with a solution prepared from a 10 cps. ethyl cellulose solution and alcohol to give a 20% wt./wt. solution. The wet mass is granulated and then dried for 18 hours at 60° C. The dry granules are reduced through a fine mesh screen and a mixture consisting of 15 g. of alginic acid, 1.5 g. of magnesium stearate and 6 g. of talc is added. This mixture is compressed in a tableting machine using 13/32" tools with a bisecting break line. The resulting tablet is a buff or off-white tablet weighing approximately 325 mg., each containing 200 mg. of N-(3-trifluoromethylphenyl)anthranilic acid.

*Example 2*

A mixture of 430 g. of the sodium salt of N-(3-trifluoromethylphenyl)anthranilic acid, 100 g. of dry potato starch and 50 g. of milk sugar is blended in a mixer. The dry mixture thus obtained is wet granulated with a solution prepared from a 10 cps. ethyl cellulose solution and alcohol to give a 20% wt./wt. solution. The wet mass is granulated and dried at 60° C. The dry granules are reduced through a fine mesh screen and a mixture consisting of 15 g. of alginic acid, 1.5 g. of magnesium stearate and 6 g. of talc is added. The mixture is compressed in a tableting machine to yield tablets containing 215 mg. of the sodium salt of N-(3-trifluoromethylphenyl)anthranilic acid.

*Example 3*

A mixture of 200 g. of N-(3-trifluoromethylphenyl) anthranilic acid, 5 g. of hydrocortisone, 50 g. of dry potato starch and 50 g. of milk sugar is blended in a mixer. This dry mixture is wet granulated with a solution prepared from a 10 cps. ethyl cellulose solution and alcohol to give a 20% wt./wt. solution. The wet mass is granulated and then dried for 18 hours at 60° C. The dry granules are reduced through a fine mesh screen and a mixture consisting of 15 g. of alginic acid, 1.5 g. of magnesium stearate and 6 g. of talc is added. This mixture is compressed in a tableting machine using 13/32" tools with a bisecting break line. Yield 990 tablets weighing approximately 325 mg., each containing 200 mg. of N-(3-trifluoromethylphenyl)anthranilic acid and 5 mg. hydrocortisone.

*Example 4*

A mixture of 215 g. of N-(3-trifluoromethylphenyl) anthranilic acid calcium salt, 5 g. of prednisone, 50 g. of dry potato starch and 50 g. of milk sugar is blended in a mixer. This dry mixture is wet granulated with a solution prepared from a 10 cps. ethyl cellulose solution and alcohol to give a 20% wt./wt. solution. The wet mass is granulated and dried at 60° C. The dry granules are reduced through a No. 14 screen and a mixture consisting of 15 g. of alginic acid, 1.5 g. of magnesium stearate and 6 g. of talc is added. The mixture is compressed in a tableting machine to yield tablets containing 215 mg. of the calcium salt of N-(3-trifluoromethylphenyl)anthranilic acid and 5 mg. of prednisone.

*Example 5*

100 g. of N-(3-trifluoromethylphenyl)anthranilic acid is mixed with 200 g. of lactose and 10 g. of magnesium stearate. The resulting mixture is filled into No. 1 hard shell gelatin capsules to obtain about 975 capsules, each of which contains approximately 100 mg. of N-(3-trifluoromethylphenyl)anthranilic acid.

If desired, an equivalent amount of a non-toxic salt such as the sodium, potassium, calcium or ammonium salt can be substituted for the free acid used in the above procedure. If desired, one can also use N-(2-trifluoromethylphenyl)anthranilic acid (M.P. about 131–132° C.) or N-(4-trifluoromethylphenyl)anthranilic acid (M.P. about 176–177° C.) instead of the N-(3-trifluoromethylphenyl)anthranilic acid.

*Example 6*

100 g. of the sodium salt of N-(3-trifluoromethylphenyl)antharanilic acid is mixed with 5 g. of hydrocortisone, 95 g. of lactose and 10 g. of magnesium stearate. The mixture is filled into hard gelatin capsules to produce about 990 capsules, each of which contains 100 mg. of the sodium salt of N-(3-trifluoromethylphenyl)anthranilic acid and 5 mg. of hydrocortisone.

*Example 7*

200 g. of N-(4-trifluoromethylphenyl)anthranilic acid is dissolved in 960 g. of cottonseed oil by warming. The resulting solution is filled into soft gelatin capsules to produce about 2000 capsules, each of which contains 100 mg. of N-(4-trifluoromethylphenyl)anthranilic acid.

*Example 8*

50 g. of the sodium salt of N-(3-trifluoromethylphenyl)anthranilic acid is dissolved in 600 ml. of distilled water and the solution diluted to 1000 ml. The solution is filtered through a bacterial filter and filled into ampoules in 3 ml. portions. Yield about 330 ampoules, each containing 150 mg. of the sodium salt of N-(3-trifluoromethylphenyl)anthranilic acid.

*Example 9*

A mixture of 20 g. of N-(3-trifluoromethylphenyl)-anthranilic acid with 50 ml. of water containing 0.01 g. of a silicone antifoaming agent and 1 ml. of polyvinyl pyrrolidone is milled in an ointment mill. 1 g. of sorbitan monolaurate, 5 g. of sodium benzoate, 2.5 g. of sodium citrate, 100 g. of glycerin and 200 g. of sucrose are blended in, the mixture being stirred until it is homogeneous. A solution of 10 g. of 25 cps. methyl cellulose in 165 ml. of water is then added with stirring, followed by 15 g. of sodium carboxymethyl cellulose, 1 g. of imitation grape flavor, 1 g. of grape vanilla raspberry flavor blend and 0.77 g. of alcohol. The mixture is adjusted to pH 5.1 with dilute hydrochloric acid, diluted to 1000 ml. with distilled water and homogenized. The resulting suspension contains 20 mg. of N-(3-trifluoromethylphenyl)-anthranilic acid per milliliter.

The relative amount of the active ingredient in the compositions of the invention may be varied. However, the anthranilic acid and/or salt thereof should be present in a concentration sufficient to ensure that a suitable dosage will be obtained. The indicated oral dose for adults (proportionately less for children) varies from about 100 to 1500 mg. daily. When continued medication is necessary, smaller doses may be given at varying intervals or dosage forms adaptable to sustained release may be used.

The N-(3-trifluoromethylphenyl)anthranilic acid used in the preparation of the compositions of the invention can be prepared as described in Journal of the Chemical Society, page 33 (1948), as well as by alternative methods. The isomeric compounds, N-(2-trifluoromethylphenyl)anthranilic acid and N-(4-trifluoromethylphenyl)-anthranilic acid, can also be prepared according to the procedure of the reference by substituting o-aminobenzotrifluoride or p-aminobenzotrifluoride for the m-aminobenzotrifluoride. The pharmaceutically-acceptable salts can be prepared by the reaction of the acid with a base such as sodium hydroxide, sodium carbonate, sodium bicarbonate, potassium carbonate, calcium hydroxide, ammonium hydroxide, choline or ethanolamine.

I claim:
1. A method for treating inflammatory syndromes in human beings which comprises administering a substance of the class consisting of N-(trifluoromethylphenyl)anthranilic acids of the formula

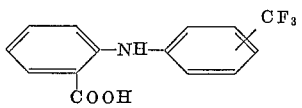

and pharmaceutically-acceptable non-toxic salts thereof.

2. A method for treating inflammatory syndromes in human beings, in which a substance of the class consisting of N-(trifluoromethylphenyl)anthranilic acids of the formula

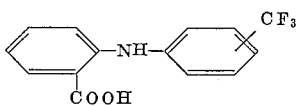

and pharmaceutically-acceptable non-toxic salts thereof is administered orally.

3. A method for treating inflammatory syndromes in human beings, in which a substance of the class consisting of N-(3-trifluoromethylphenyl)anthranilic acid and pharmaceutically-acceptable non-toxic salts thereof is administered orally.

4. A method for treating inflammatory syndromes in human beings in which N-(3-trifluoromethylphenyl)anthranilic acid is administered orally.

5. A method for treating inflammatory syndromes in human beings, in which a substance of the class consisting of N-(trifluoromethylphenyl)anthranilic acids of the formula

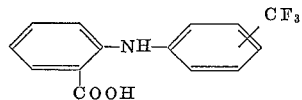

and pharmaceutically-acceptable nontoxic salts thereof is administered parenterally.

6. A solid pharmaceutical composition in dosage unit form possessing anti-inflammatory activity and suitable for oral administration, comprising a non-toxic solid pharmaceutical carrier and 25 to 500 mg. of substantially chemically pure N-(3-trifluoromethylphenyl)anthranilic acid per dosage unit.

References Cited in the file of this patent

Wilkinson et al.: J. Chem. Soc. (London), 1948, pages 32–35.

Wiesel et al.: J. Pharmacy and Pharmacology, 6: 7, pages 492–493, July 1954.

Bevin et al.: J. Pharmacy and Pharmacology, 7: 12, pages 1022–1031, December 1955.

J.A.M.A., 164: 17, page 1955, August 24, 1957.